United States Patent [19]

Tsutsumi

[11] Patent Number: 5,214,332
[45] Date of Patent: May 25, 1993

[54] ELECTRIC MOTOR

[75] Inventor: Shunsaku Tsutsumi, Yokohama, Japan

[73] Assignee: ALPHA Corporation, Kanagawa, Japan

[21] Appl. No.: 736,604

[22] Filed: Jul. 26, 1991

Related U.S. Application Data

[63] Continuation-in-part of Ser. No. 368,769, Jun. 20, 1989, abandoned.

[51] Int. Cl.⁵ .................. H02K 49/00; H02K 7/10; E05B 3/00
[52] U.S. Cl. ..................... 310/103; 310/76; 310/78; 292/336.3
[58] Field of Search .......... 310/76, 78, 92, 94, 310/98, 100, 103; 192/84 C, 30 V; 70/294, 275, 277; 74/470; 292/201, 336.3

[56] References Cited

U.S. PATENT DOCUMENTS

| | | | |
|---|---|---|---|
| 2,195,652 | 4/1940 | Hutchins et al. | 310/78 |
| 2,408,808 | 10/1946 | Paulus et al. | 310/76 |
| 2,501,245 | 3/1950 | White | 310/76 |
| 2,660,901 | 12/1953 | Latzen | 74/470 |
| 2,760,092 | 8/1956 | Galinski | 310/78 |
| 3,233,135 | 2/1966 | Holzer et al. | 310/209 |
| 3,280,352 | 10/1966 | Chapman | 310/76 |
| 3,407,319 | 10/1968 | Arraiza | 310/77 |
| 3,567,980 | 3/1971 | Kreuter | 310/75 |
| 3,828,754 | 8/1974 | Carlsson | 310/70 |
| 4,156,817 | 5/1979 | Preece et al. | 310/80 |
| 4,397,380 | 8/1983 | Yew | 310/78 |
| 4,528,473 | 7/1985 | Tezuka | 310/256 |
| 4,573,723 | 3/1986 | Morita et al. | 70/279 |
| 4,674,781 | 6/1987 | Reece et al. | 292/336.3 |
| 4,978,155 | 12/1990 | Kobayashi | 292/336.3 |

Primary Examiner—Steven L. Stephan
Assistant Examiner—C. LaBalle
Attorney, Agent, or Firm—Bachman & LaPointe

[57] ABSTRACT

A miniature electric motor having a magnetic clutch wherein the clutch includes a metallic element and a non-metallic element; the non-metallic element being operative to preclude physical contact between the motor and the metallic element of the clutch.

8 Claims, 5 Drawing Sheets

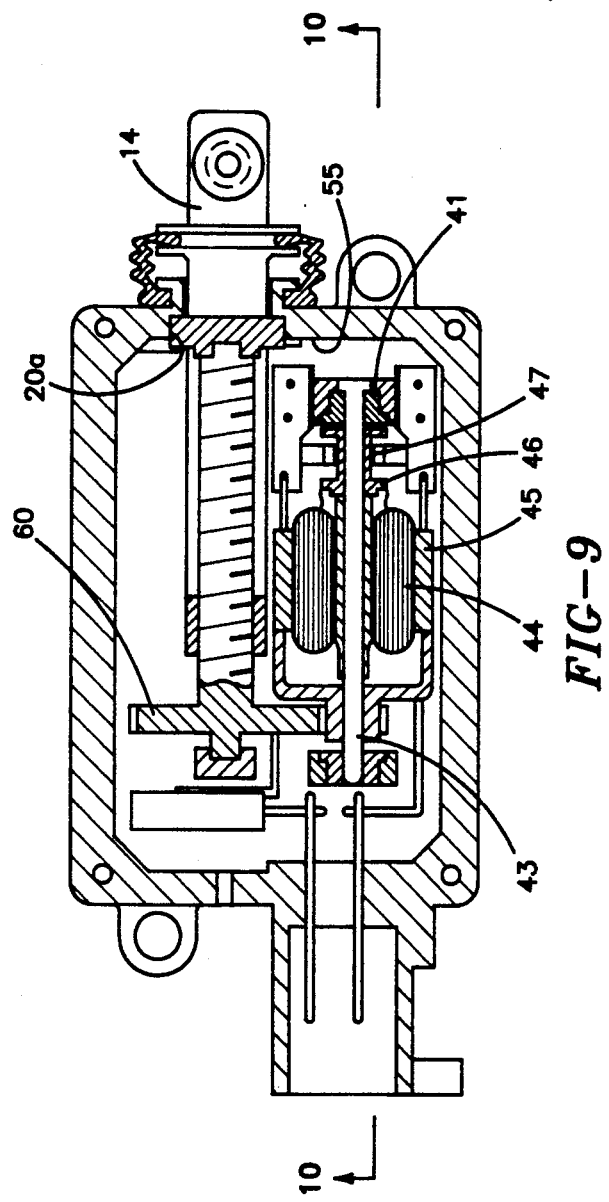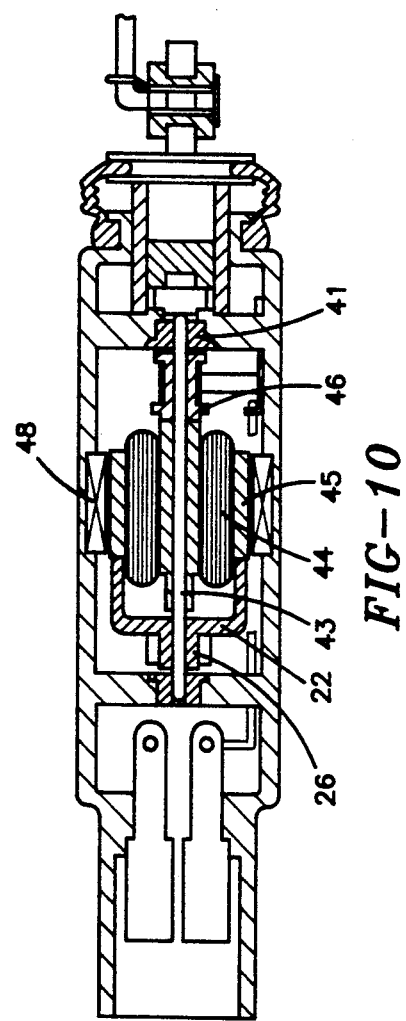

ELECTRIC MOTOR

BACKGROUND OF THE INVENTION

This application is a continuation-in-part of U.S. application Ser. No. 368,769, now abandoned, entitled ELECTRIC MOTOR, Filed Jun. 20, 1989, by Shunsaku Tsutsumi.

FIELD OF THE INVENTION

The present invention relates to a motor, especially to an electric motor provided with a clutch electromagnetically operated in contrast to friction operated.

DESCRIPTION OF THE PRIOR ART

Many kinds of electric motors have been utilized in various electromechanical fields to electromagnetically operate follow-up mechanisms. For example, Japanese Patent Publication No. 62-21110 published May 11, 1989 discloses a door locking device for an automotive vehicle which may be shifted to a locking or unlocking position by means of a motor. The door locking device comprises an intermediate reduction gear engaged with a pinion mounted on a drive shaft of the motor, a swing gear connected to an output shaft for operating a lever of a door locking mechanism, and an intermediate pinion engaged with the swing gear. The intermediate reduction gear and intermediate pinion coaxially mounted, are drivingly connected to each other through a resilient member with a given angular gap corresponding to a reciprocating stroke of the lever. In this locking structure, in order to manipulate the lever by manually pushing or pulling a knob mounted on a door of the vehicle without any additional load, the intermediate reduction gear is reversely rotated by means of elasticity of the resilient member to a position wherein the intermediate pinion is angularly away from the intermediate reduction gear.

In this structure, it is apparent that insufficient return of the intermediate reduction gear by the motor or insufficient manual operation prevents rotation of the intermediate pinion by easy manual operation of the knob due to production of a reverse electromotive force in a rotated core within the motor. In this case, the intermediate reduction gear can not be returned to the regular position unless an operator manually applies a large pushing or pulling force to the knob. In addition, this actuator requires at least two gears and two pinions, thereby resulting in an increased number of parts and elongated time for assembling with increased cost for manufacture. Moreover, due to need of the intermediate reduction gear and intermediate pinion, the device can not be made into a small size.

Otherwise, a complicated clutch mechanism is provided between the pinion mounted on the output shaft of the motor and a driven member to transmit a driving force, but there is a defect in that such a clutch mechanism needs further increased number of parts. In addition, when rotation of the motor is stopped on the way of the stroke for example by a mechanical stick between parts, it is not easy to move the driven member to the desired position by manually moving the knob, because of the above-mentioned production of the reverse electromotive force in the core of the motor. Also, it is requested that such an actuator is manufactured with the small size, and is surely operated.

SUMMARY OF THE INVENTION

An object of the present invention is to provide an electric motor of small size including a magnetic clutch mechanism.

Another object of the invention is to provide an electric motor including a core which allows manual movement of a driven member independent of the mass of the core when the core is deenergized.

A further object of the invention is to provide an electric motor which does not prevent movement of a driven member by manual operation.

Still another object of the invention is to provide an electric motor suitable to a door locking device which is shifted to a locking or unlocking position by easy manual operation or by the motor.

The electric motor according to the present invention comprises a core rotatably mounted in a housing and magnetic clutch means positioned in the housing for rotation and drivingly connected to a driven member. At least a portion of the magnetic clutch means is formed of a magnetic material so that it may be electromagnetically attached to the core for integral rotation of the clutch means and the core. The magnetic clutch means is detached or separated from the core for rotation of the clutch means independent of the core when the core is demagnetized to release the electromagnetic attachment of the clutch means.

A spring is provided between the core and magnetic clutch means to urge resiliently the clutch means away from the core. The magnetic clutch includes a non-metallic spacer which prevents direct contact between the core and that portion of the magnetic clutch means formed of magnetic material to damp noise and to prevent wear or damage which would otherwise occur if the magnetic material and the core impact one another.

The inclusion of the non-metallic material is critical because it functions to preclude direct contact and serious damage that would otherwise occur if the magnetic material of the magnetic clutch means were free to slam into the core.

The core and the magnetic material of the clutch are hard and very susceptible to cleavage, chipping and cracking.

It is to be clearly understood that the non-magnetic material of the magnetic clutch means functions entirely as a buffer and has no function or purpose such as one would assign to a friction clutch.

Therefore, the magnetic clutch means of the present invention is not a friction clutch.

The magnetic clutch means is coaxially mounted relative to the core. The core has a periphery with which the non-magnetic portion of the magnetic clutch means may contact when the core is electrically magnetized. The electric motor includes winding means wound around the core to electrically magnetize and thereby rotate the core when electric current flows through the winding means. When the winding means is deenergized to demagnetize the core, the clutch means is released from the electromagnetic attachment by spring means.

The magnetic clutch means includes a body portion supported by a bearing, an attached pinion and a flange of substantially cup-like shape of a magnetic material such as iron or ferroalloy. The flange portion of the magnetic clutch means may be integrally formed of the magnetic material; but, the body portion and pinion may be formed of synthetic resin or metal, as desired.

At least one of the core and the magnetic clutch means is slightly movable axially relative to the shaft. In one embodiment of the invention, the magnetic clutch means is supported for axial sliding movement on the shaft of the core which is rotatably positioned within a hole formed in the clutch means.

In a further embodiment of the invention, the core is mounted on the shaft for free rotation and clutch means is secured to the shaft so that one of the core and clutch means may travel axially and come into contact with the other when the core is electrically magnetized.

When the winding means wound around the core is energized to operate the driven member by means of the motor, the core which supports the winding means is electrically magnetized. The clutch means is attracted by the core due to the electromagnetic action, thereby resulting in the electromagnetic coupling of the core and clutch means. Therefore, the clutch may be rotated together with the core and transmit the driving force to the driven member. Upon deenergization of the motor, the core is demagnetized and the electromagnetic coupling of the core and clutch means is released so that the clutch means may be rotated independent of the core, thus allowing easy manual operation of the driven member.

As above-mentioned as well as other objects of the present invention will become apparent during the course of the following detailed description and appended claims.

BRIEF DESCRIPTION OF THE DRAWINGS

FIG. 9 is a plan view of FIG. 8.

FIG. 10 is a section view taken along a line 10—10 of FIG. 9.

DETAILED DESCRIPTION OF THE INVENTION

Embodiments of the present invention will be described hereinbelow in connection with actuators shown in FIGS. 1-12 applied to a door locking device of an automotive vehicle.

Figure 1:
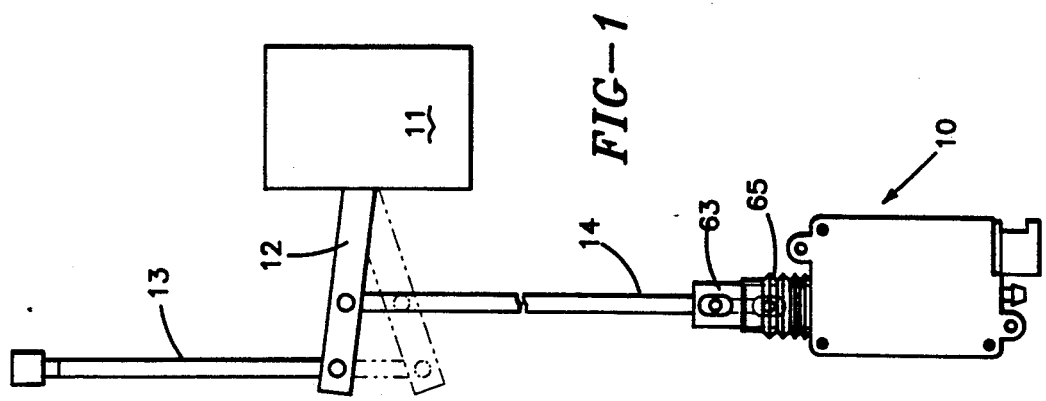
FIG. 1 is a schematic diagram of an embodiment of the electric motor according to the present invention which is applied to a door locking device of an automotive vehicle.

As illustrated in FIG. 1, an actuator 10 may be utilized for operation of a lock lever 12 provided in an automotive door locking device 11. The lock lever 12 is connected to a locking knob 13 which extends upwardly from a door of the automotive vehicle and also to a rod 14 of the actuator 10. As understood in a usual way, when the lock lever 12 is in the upper position shown with full line, the door locking device 11 is in the unlocked position to open the door. Adversely, when the lock lever 12 is in the lower position shown with dotted line, the door locking device 11 is in the locked position to prevent opening of the door.

Figure 2:
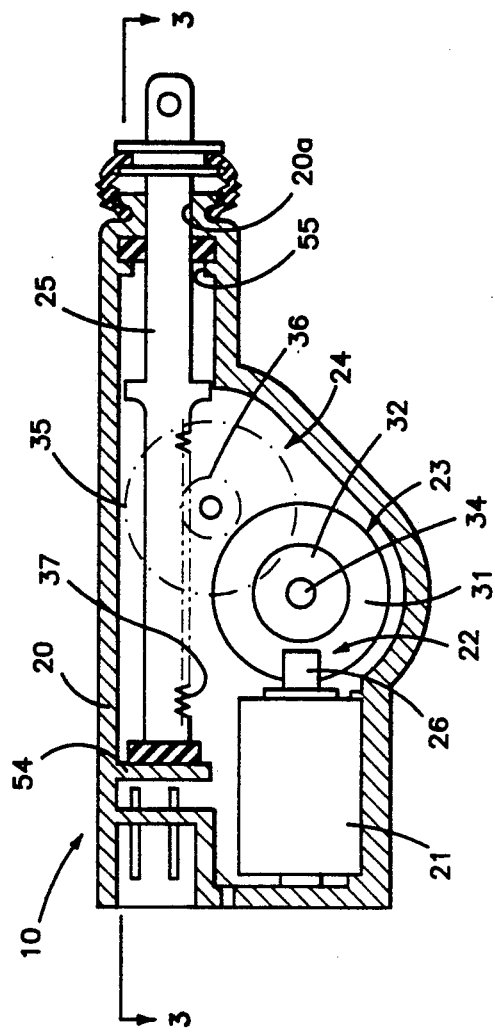
FIG. 2 is a plan view of the electric motor of the invention shown partially in section.
Figure 3:
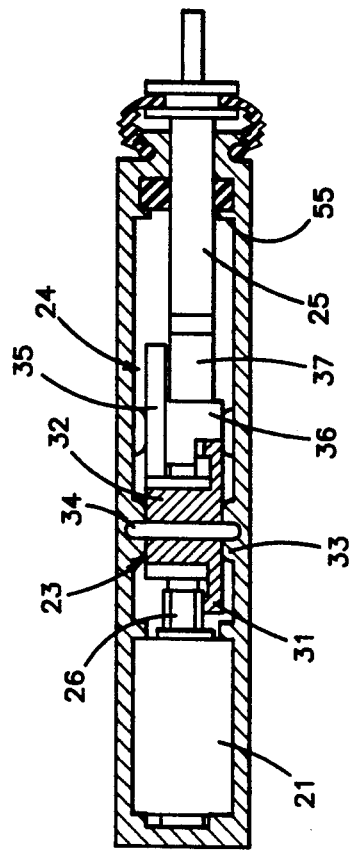
FIG. 3 is a section view taken along a line 3—3 of FIG. 2.
Figure 5:
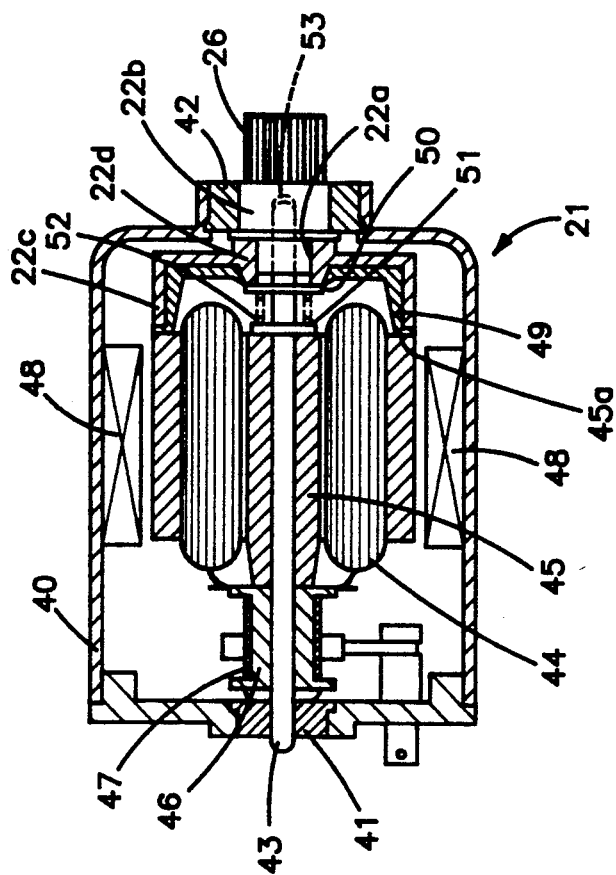
FIG. 5 is a section view of the motor provided with the clutch means.
Figure 4:
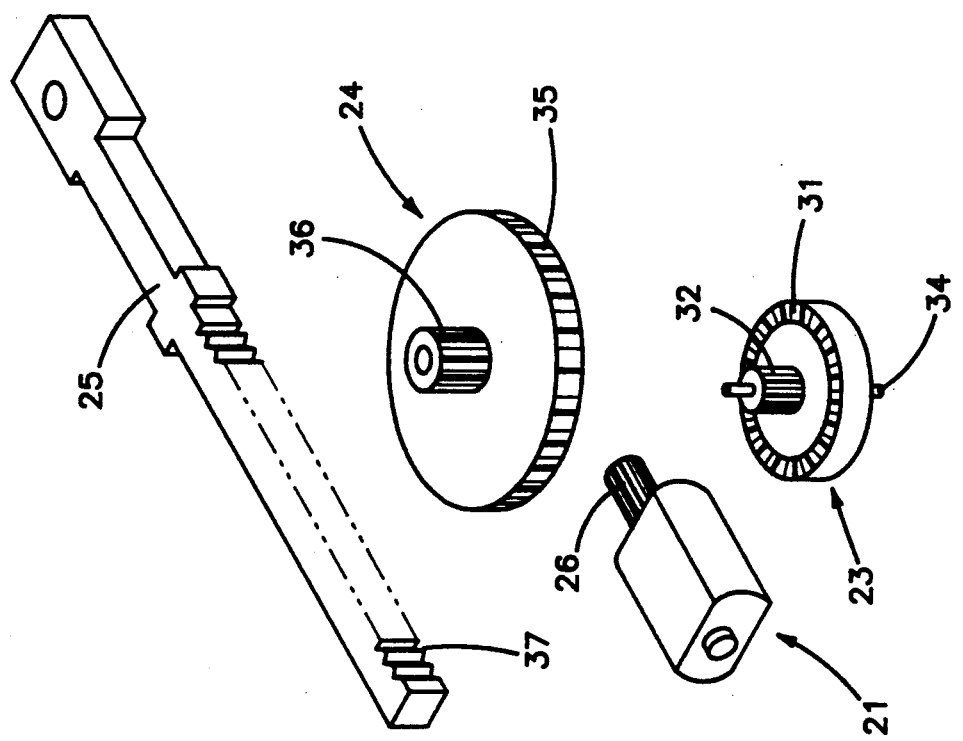
FIG. 4 is a perspective view of the motor and driven members.

FIGS. 2-4 exhibit a first embodiment of the present invention. The actuator 10 comprises a housing 20, a motor 21 located within the housing 20, clutch means 22 mounted within the motor 21, a first driven member 23 drivingly connected to the clutch means 22, a second driven member 24 drivingly connected to the first driven member 23, and a third driven member 25 drivingly connected to the second driven member 24. As shown in FIG. 5, the clutch means 22 is coaxially mounted to the shaft 43 which is rotatably supported by the hole 22a and a first bearing 41. The clutch means 22 is rotatably supported on a second bearing 42 and is provided with a flange 22c formed into substantially a cup-like shape of a magnetic material such as iron or ferroalloy by sintering, pressing or forging. The clutch means 22 further comprises a body portion 22d having a hole 22a and a pinion 26 integrally formed therewith. The first driven member 23 includes a crown gear 31 and a pinion 32 integrally formed. The crown gear 31 is engaged with the pinion 26. The first driven member 23 is rotatably mounted on an axis 34 which is supported by bearings 33 fixed to the housing 20. A spur gear 35 of the second driven member 24 is engaged with the pinion 32. A pinion 36 formed integrally with the spur gear 35 is meshed with a rack 37. Outwardly protruded from an opening 20a of the housing 20 is the third driven member 25, the outer end of which is connected to the rod 14 shown in FIG. 1. The first to third driven members 23 to 25 provide an interlocked reduction device which may be formed of a synthetic resin such as nylon or polyacetal resin.

FIG. 5 indicates the motor 21 which comprises a casing 40 supporting the first and second bearings 41 and 42, a shaft 43 having one end located within the hole 22a in the clutch means 22 and the other end carried on the first bearing 41, a core 45 attached on the shaft 43 and having winding means 44, a commutator 46 attached on the shaft 43 in the proximity of the core 45, brushes 47 provided in contact relation to the commutator 46, magnets 48 fixed around the core 45, an insulating spacer 49 mounted on the shaft 43 adjacent the magnetic portion of the magnetic clutch means 22, a pair of abutments 50, 51 mounted on the shaft 43 adjacent respectively to the spacer 49 and core 45, and a spring 52 wound around the shaft 43 between the abutments 50 and 51. The core 45 has a periphery 45a which attracts the magnetic clutch means 22 when the core 45 is electrically magnetized. The spacer 49 blocks contact between the magnetic flange 22c and the core 45 to prevent noise, wear or damage which would be produced upon direct contact of the flange 22c with the core 45, as described previously. The spring 52 functions to certainly keep the magnetic clutch means 22 away from the core 45 when it is electrically demagnetized.

In the embodiment shown in FIG. 5, an axial gap 53 is formed between the shaft 43 and the hole 22a of the magnetic clutch means 22 which may be rotated on the second bearing 42. Although not shown in detailedly in the drawings, the core 45 and the shaft 43 are slightly movable in the axial direction with the displacement in a range of 0.1 mm to 1.0 mm. The magnetic clutch means 22 can rotate, but not axially move.

In operation, when the winding means 44 is energized, the core 45 is electrically magnetized. Then, the core 45 attracts the clutch means 22 due to the electrically magnetized action and thereby the core 45 and the shaft 43 relatively move toward the clutch means 22. Accordingly, the periphery 45a of the core 45 attracts the flange 22c of the clutch means 22 for electromagnetic coupling. Physical contact is blocked by the spacer 49. As the clutch means 22 is rotated together with the core 45, the third driven member 25 is moved rightward in the lengthwise direction in FIG. 2 through the first and second driven members 23 and 24, and is stopped when it is traveled to a projecting stopper 55 integrally formed in the housing 20. In contrast thereto, when electric current in the reverse direction is supplied to the winding means 44, the clutch means 22 is rotated in the reverse direction, and therefore the third driven member 25 is traveled leftward in FIG. 2 and stopped upon contact with a wall 54 of the housing 20.

Upon deenergization of the winding means 44, the core 45 is demagnetized and the electromagnetic coupling of the core 45 and clutch means 22 is released. Accordingly, when the knob 13 is manually operated, the clutch means 22 may be rotated through the first to third driven members 23 to 25, independent of the core 45, thus allowing easy manual operation of the knob 13.

The foregoing embodiment of the present invention may be varied in various ways. In FIG. 5, the core 45 and shaft 43 are designed to axially move. Instead, only the core 45 may axially move, whereas the clutch means 22 and the shaft 43 may be rotated but prevented from axial movement.

Figure 6:
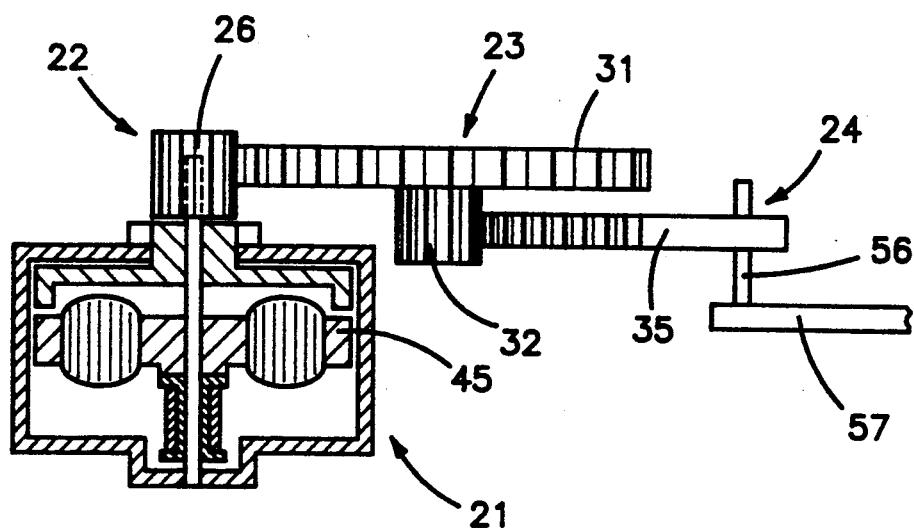
FIG. 6 is a schematic diagram indicating a second embodiment of the invention.
Figure 7:
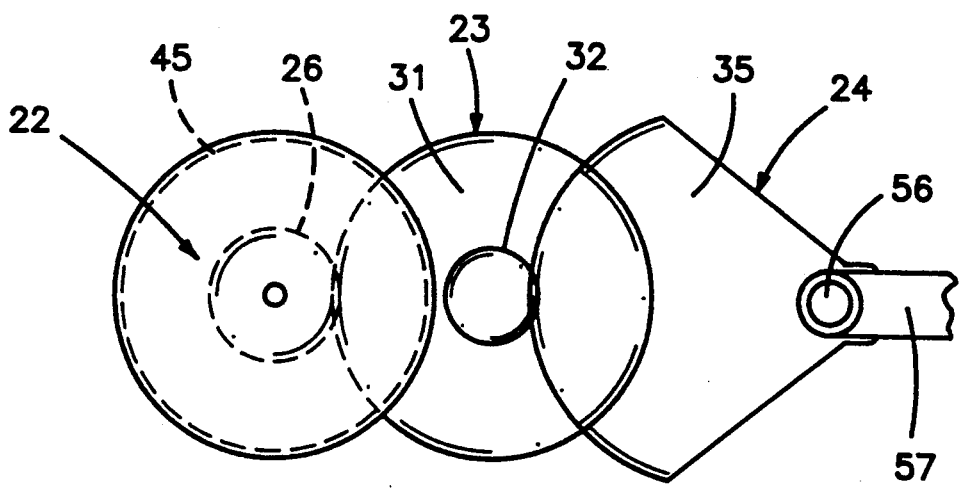
FIG. 7 is a plan view of FIG. 6.

In addition, for example, in a second embodiment of the invention shown in FIGS. 6 and 7, the first driven member 23 may comprise a spur gear 31 and a pinion 32 without any crown gear. The spur gear 31 is meshed with the pinion 26, and the pinion 32 is connected with a V-shaped gear 35 which is mounted on a shaft 56 together with an arm 57 to provide the second driven member 24.

Figure 8:
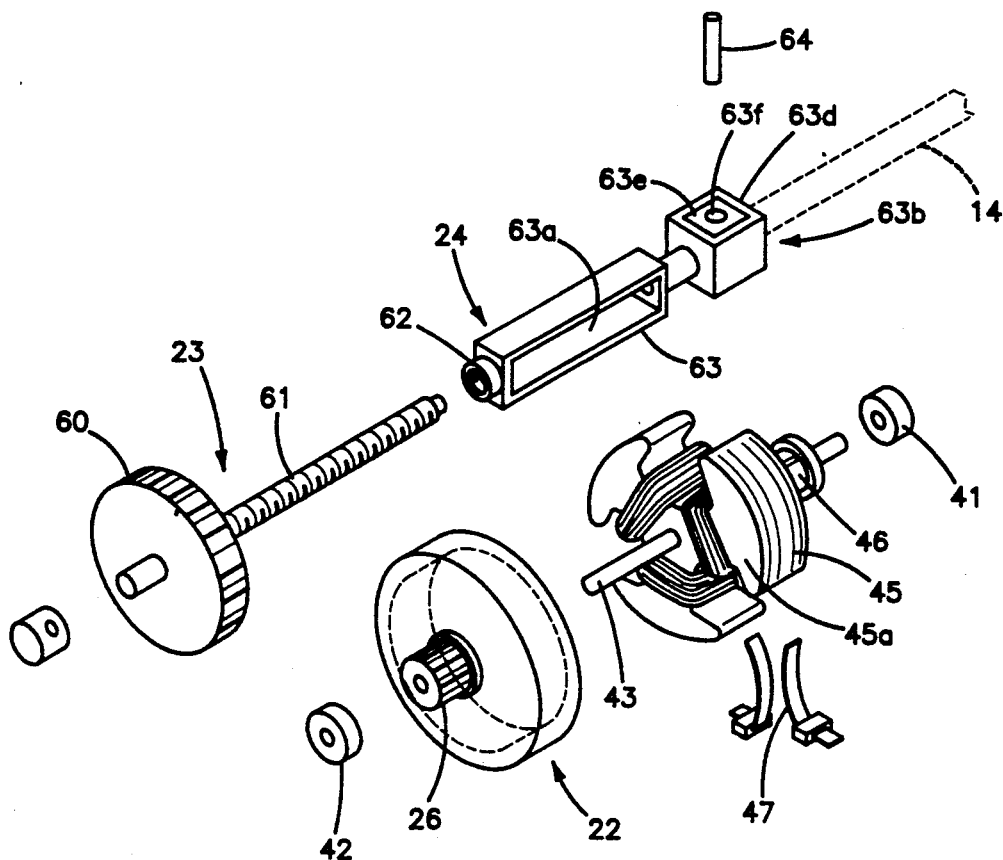
FIG. 8 is an exploded perspective view of a third embodiment of the invention.

Also, in another embodiment of the invention shown in FIGS. 8 to 10, the first driven member 23 may comprise a spur gear 60 rotatably mounted within the housing 20 in engaged relation to the pinion 26, and a rotatable and axially movable feed screw 61 formed integrally with the spur gear 60. The second driven member 24 may comprise a connector 63 which includes a nut portion 62 in mesh with the feed screw 61 and projects out of the housing 20 for reciprocal movement. The connector 63 is provided with a notch 63a to receive the feed screw 61. At the outer end of the connector 63, a connecting portion 63b is provided to link with the rod 14. A water-proof rubber bellows portion 65 is attached between the connecting portion 63b and the housing 20. The connecting portion 63b is formed with a hole 63d in which a resilient member 63e of such as rubber is placed to absorb impulsive loads which occur when the connecting portion 63b impinges the housing 20. The resilient member 63e has a through hole 63f to receive a pin 64 which passes through an opening (not shown) formed in the rod 14. Unlike the embodiment shown in FIG. 4 wherein the core 45 is axially movable, FIGS. 8 to 10 illustrate another embodiment wherein the clutch means 22 is slidable along the shaft 43 for attachment to or detachment from the core 45. As shown in FIG. 10, magnets 48 are disposed around the core 45.

Figures 11, 12:
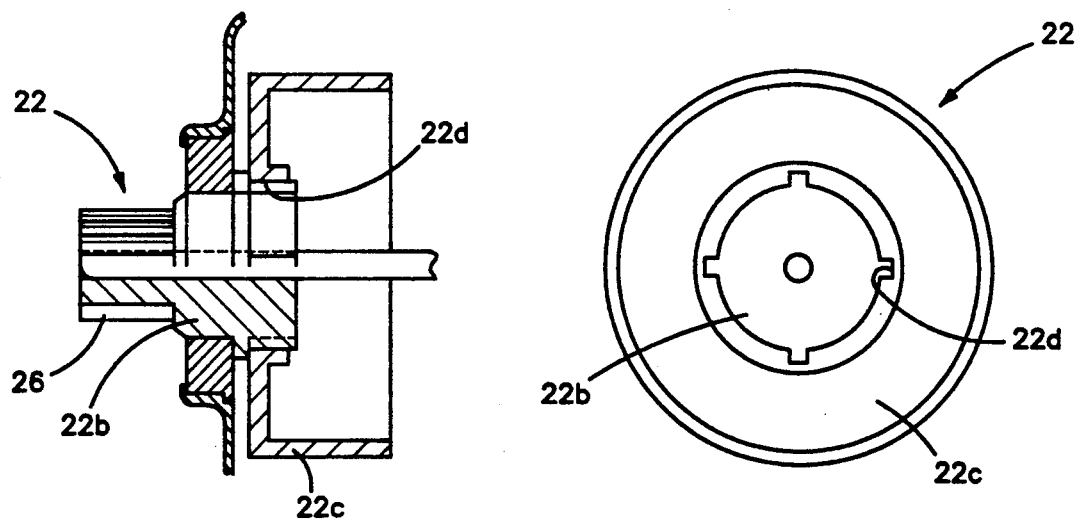
FIG. 11 is a section view of the clutch means indicating a fourth embodiment of the invention.
FIG. 12 is an elevation view of FIG. 11.

Moreover, as understood from FIGS. 11 and 12, in lieu of fabricating the whole clutch means 22 of iron or ferroalloy material, the body portion 22b including the pinion 26 may be formed by zinc diecasting and the cup-like flange 22c may be formed of magnetic material so that it is slidable on a spindle portion 22d of the body portion 22b.

As above-mentioned, when the first to third driven members 23 to 25 are driven by energization of the motor 21, electric current flows through the winding means 44 wound around the core 45 of the motor 21 and thereby the core 45 is electrically magnetized. Accordingly, the core 45 attracts the clutch means 45 due to the electromagnetic action for electromagnetic coupling. Then, the clutch means 22 may rotate together with the core 45 to transmit the driving force to the driven members 23 to 25.

When the motor is deenergized, the core 45 is demagnetized to release the electrically magnetic coupling of the core 45 to the clutch means 22 which is consequently separated therefrom. In this condition, the clutch means 22 may rotate independent of the core 45, thereby causing easy manual operation of the knob 13.

According to the present invention, the electric motor of small size is obtained including less number of parts with lower cost by utilizing the electromagnetic coupling and separation of the core and clutch means when the winding is energized and deenergized.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A miniature electric motor system including a housing, a shaft mounted on said housing for supporting an energizable core rotatably, winding means for energizing said core and for reversing rotation of said core, a magnetic clutch means supported by said housing and disposed coaxially relative to said shaft, lever means, said clutch means including gear means cooperating with lever means for driving said lever means, said magnetic clutch means having a normal position spaced from said core, resilient means for maintaining said spacing, said magnetic clutch means and said core being operable to attract one another in opposition to said resilient means to create a magnetic, driving coupling between the core and said clutch means when said core is energized, said clutch means including at least two cup-like elements, a first element being fabricated of magnetic material, a second element being fabricated of non-magnetic material, each cup-like element having a circular side wall, the side wall of each element terminating in a ring-like periphery, the main body of the non-magnetic second element being received within said magnetic first element in telescopic fashion so that said ring-like periphery of said second element projects beyond and is offset relative to the corresponding periphery of said first element whereby said clutch defines a compact, small assembly, and whereby said second element is operative to block physical contact between said first element and said core when said core is energized and said magnetic coupling is established.

2. The system of claim 1 in which the first element of said clutch means includes a bottom wall and a pinion means, spline means making a driving connection between said bottom wall and said pinion means whereby said first element is movable axially relative to said pinion means while maintaining said driving connection with said pinion means.

3. The system of claim 2 wherein the spline means and said pinion means define a one piece, seamless die casting.

4. The system of claim 3 wherein the one piece, seamless die casting is fabricated of zinc.

5. An electric motor system including a housing, a shaft mounted on said housing for supporting an energizable core rotatably, winding means for energizing said core and for reversing rotation of said core, a magnetic clutch means supported by said housing and disposed coaxially relative to said shaft, lever means, said clutch means including gear means cooperating with lever means for driving said lever means, said magnetic clutch means having a normal position spaced from said core, resilient means for maintaining said spacing, said magnetic clutch means and said core being operable to attract one another in opposition to said resilient means to create a magnetic, driving coupling between the core and said clutch means when said core is energized, said clutch means including at least three elements, a first element being fabricated of magnetic material, a second element having a spindle portion being fabricated of non-magnetic material whereby said first element is slidable on the spindle portion of the second element for integral rotation when said core is energized and said magnetic coupling is established, a third element being fabricated of non-magnetic material, said first and third elements being cup-like in configuration;

each cup-like element having a circular side wall, the side wall of each element terminating in a ring-like periphery, the main body of the non-magnetic third element being received within said magnetic first element in telescopic fashion so that said ring-like periphery of said third element projects beyond and is offset relative to the corresponding periphery of said first element whereby said clutch defines a compact, small assembly, and whereby said third element is operative to block physical contact between said first element and said core when said core is energized and said magnetic coupling is established.

6. The motor system of claim 5 in which said first element is made of iron or ferroalloy.

7. The motor system of claim 5 in which said first element is made of iron or ferroalloy by sintering, pressing or forging.

8. The motor system of claim 5 in which said second element is made of zinc.

* * * * *